(No Model.)
T. A. EDISON.
PROCESS OF AND APPARATUS FOR GENERATING ELECTRICITY.
No. 435,688. Patented Sept. 2, 1890.
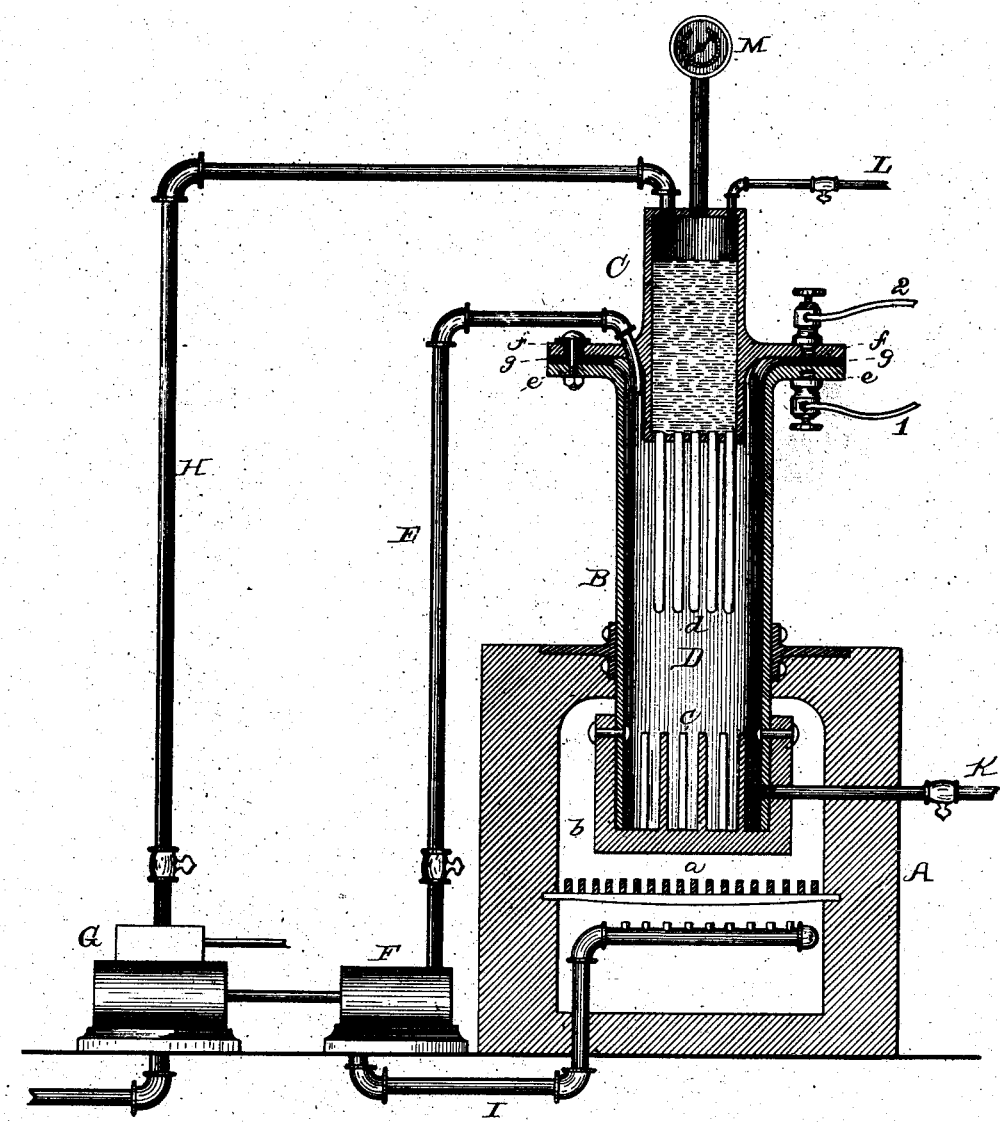
ATTEST:
INVENTOR:

UNITED STATES PATENT OFFICE.

THOMAS A. EDISON, OF MENLO PARK, NEW JERSEY.

PROCESS OF AND APPARATUS FOR GENERATING ELECTRICITY.

SPECIFICATION forming part of Letters Patent No. 435,688, dated September 2, 1890.

Application filed September 19, 1883. Serial No. 106,884. (No model.)

*To all whom it may concern:*

Be it known that I, THOMAS A. EDISON, of Menlo Park, in the county of Middlesex and State of New Jersey, have invented a new and useful Improvement in the Process of and Apparatus for Generating Electricity, (Case No. 597,) of which the following is a specification.

My invention relates to the direct generation in an economical manner of powerful continuous currents of electricity from the elements, or salts or compounds thereof, by chemical reaction. Electricity has been generated heretofore by chemical reactions in liquids, which acted as the conducting media; but I propose to generate electricity by dry chemical reactions, and to use the gases liberated as the conducting media of the generating apparatus. This I am able to do by causing the dry chemical reaction to take place in a vacuum-chamber in a rarefied atmosphere forming the conducting medium, and in the presence of heat which maintains the chemical reaction and increases the electrical conductivity of the rarefied atmosphere. Such compounds or compounds and elements are preferably used that, under the conditions of heat and rarefaction employed, the chemical reaction which takes place within the inclosing-chamber will produce a solid or liquid non-gaseous product which remains at the point where the reaction takes place, and will liberate a gas which rises into the chamber. The inclosing-chamber being electrically divided into two parts, which form the poles or current-collectors of the apparatus, the non-gaseous product remains upon and charges one pole while the gaseous product charges the other pole. There is kept up a continual exhaustion of the chamber to maintain the proper degree of exhaustion as the reaction takes place. The part or pole of the electrically-divided vacuum-chamber which is not heated externally may be, if desired, of great heat-absorbing capacity, so as to absorb rapidly the heat of the chamber, producing a lower temperature than at the other part or pole of the chamber. The construction to absorb the heat may be that of a steam-boiler, so that the steam generated can be employed for operating the vacuum apparatus, which keeps up a continuous exhausting action upon the chamber. The gas which is continually being withdrawn from the vacuum-chamber may, if suitable, be forced into the fire-box below or above the grate and burned to assist in heating the chamber; or it can be admitted into the vacuum-chamber of another generator and utilized therein in producing dry chemical reaction.

A great variety of compounds of elements or elements and compounds of elements may be used in producing the chemical reactions described, since nearly all chemical reactions produce electricity under the proper conditions. A reducible or oxidable substance might be employed—such as a metal or metalloid, acted upon by a gaseous liquid or solid compound containing an element with which it will readily combine when the compound is decomposed; or a non-metallic material, like carbon, might be employed instead of the metal or metalloid. An efficient method is to use a metal—such, for instance, as iron—preferably in a divided condition—which is placed in the chamber and brought up to incandescence therein, and then to permit steam or water in the proper quantities to enter the chamber. The oxygen of the watery vapor will combine with the metal, and the hydrogen will be liberated, the chemical reaction setting up a powerful current of electricity, the rarefied hydrogen charging one pole, while the other pole is charged by the iron. The operation is a continuous one until the metal is oxidized, the heat being kept up and the steam or water being permitted to flow into the chamber in a continuous and properly-regulated jet. Carbon in any form can also be conveniently employed—such as charcoal, coke, lamp-black, or anthracite, or other coal mixed with a reducible oxide of a metal. Oxide of lead might be mixed with carbon and placed in the chamber. As the heat is raised the oxygen of the oxide of lead will combine with the carbon, producing carbonic oxide and reducing the lead to the metallic form. The rarefied carbonic oxide passes into the chamber and charges one pole, while the metallic lead charges the other pole.

The hydrogen or carbonic oxide withdrawn continuously by the vacuum apparatus can be forced into the fire-box and burned as fuel for heating the chamber; or, where the gas is suitable for the purpose, it can be used for producing chemical reactions in other vacuum-chambers. Carbonic oxide being a powerful reducing agent is especially adapted for this purpose, and as withdrawn from one chamber could be used to reduce a metallic oxide in another chamber. The chemical reactions in the apparatus can also be reversed, if desired. Thus metallic iron could be oxidized by admitting water or steam to the chamber, producing currents of electricity, and then charcoal could be placed in the chamber and the oxide reduced to a metallic form; or this could be done by the admission of carbonic oxide, this reaction also producing currents of electricity. The metallic iron may then be again oxidized, and these operations may be repeated indefinitely, the waste of the metal or oxide being made good, as found necessary.

An apparatus for carrying the method into practice is shown in the accompanying drawings, in which the apparatus is illustrated in partial vertical section and elevation.

A is a suitable furnace, of which $a$ represents the grate-bars.

B is a flanged tubular vessel supported upon the furnace and having a thick cast-iron bottom plate $b$ within such furnace. On the inner surface of the bottom plate $b$ are upwardly-projecting iron rods or electrodes $c$. Upon the vessel B is supported a steam-boiler C, having water-tubes $d$ projecting downwardly into the vessel B. The vessel B and boiler-shell C have flanges $e\ f$, between which there is an insulating-packing $g$ of asbestus and cement. Suitably-insulated bolts hold the flanges together. The boiler closes the top of the vessel, forming reaction-chamber D, in which the chemical reaction takes place. Entering this chamber D is a pipe E, extending to the inlet of an air-pump F, worked by a steam-engine G, supplied with steam from boiler C by a pipe H. A pipe I extends from the outlet of the air-pump to the fire-box of the furnace.

K is the pipe for admitting water or steam to chamber D.

L is the feed-water pipe of the boiler, and M is a steam-gage.

The circuit-connections 1 2 will be made with the two parts of the chamber. A number of these generators may be connected together in multiple-arc series or multiple series to produce the desired tension and quantity of current.

What I claim is—

1. The art of generating electricity, which consists in producing dry chemical reaction in a closed chamber and charging or acting upon two terminals of the electric circuit respectively by the products of such reaction, substantially as described.

2. The art of generating electricity, which consists in producing chemical reaction in a closed chamber, maintaining a rarefied atmosphere in the chamber, and charging or acting upon two electrodes or circuit-terminals by the products of the chemical reaction, substantially as described.

3. The art of generating electricity, which consists in producing chemical reaction in a closed chamber in connection with an electrode or terminal of a circuit, maintaining a rarefied atmosphere in the chamber, and conducting the gaseous products of the chemical reaction or a part thereof against a second electrode supported in the chamber, substantially as described.

4. The art of generating electricity, which consists in producing chemical reaction in a closed chamber in connection with one electrode of a circuit, intensifying the reaction by heat, maintaining a rarefied atmosphere in the chamber, and conducting the gaseous products of the chemical reaction or a part thereof against a second electrode supported in the chamber, substantially as described.

5. The art of generating electricity, which consists in producing chemical reaction in a closed chamber, heating a portion of the chamber containing reducible or oxidizable material, such portion constituting one terminal of the circuit, and conducting the heat away from another portion of the chamber, which portion constitutes a second terminal of the circuit and is insulated from the first, substantially as described.

6. The art of generating electricity, which consists in producing chemical reaction in a closed chamber, heating a portion of the chamber containing reducible or oxidizable material, said portion constituting one terminal of a circuit, and conducting the gaseous products against a second terminal of the circuit, substantially as described.

7. The art of generating electricity, which consists in producing chemical reaction in a closed chamber, maintaining a rarefied atmosphere in the chamber, heating a portion of the chamber containing reducible material, said portion constituting one of the terminals of the circuit, and conducting heat away from another portion of the chamber, which portion constitutes a second terminal of the circuit, and is insulated from the first, substantially as described.

8. The art of generating electricity, which consists in producing chemical reaction in a closed chamber, heating a portion of the chamber containing reducible or oxidizable material, said portion constituting one terminal of the circuit, absorbing the waste heat at another portion of the chamber insulated from the first, and constituting a second circuit-terminal by maintaining water in connection therewith, thereby generating steam, substantially as described.

9. The art of generating electricity, which consists in producing chemical reaction in a closed chamber, heating a portion of the chamber containing reducible or oxidizable material, said portion constituting one terminal of the circuit, absorbing the waste heat at another portion of the chamber insulated from the first and constituting a second circuit-terminal by maintaining water in connection therewith, thereby generating steam, and driving an exhausting apparatus connected to the chamber by the steam thus generated, substantially as described.

10. The art of generating electricity, which consists in producing chemical reaction in a closed chamber, heating a portion of the chamber containing reducible or oxidizable material, said portion constituting one terminal of the circuit, absorbing the waste at another portion of the chamber insulated from the first and constituting a second circuit-terminal, maintaining water in connection therewith, thereby generating steam, driving an exhausting apparatus connected to the chamber by the steam thus generated, and burning the products exhausted in proximity to the chamber, thereby heating it, substantially as described.

11. The art of generating electricity, which consists in producing chemical reaction in a closed chamber, charging or acting upon two electrodes or terminals by the products of the reaction and burning the liberated gases in proximity to one portion of the chamber, whereby the chamber is heated, substantially as described.

12. The art of generating electricity, which consists in producing chemical reaction in a closed chamber, charging or acting upon two electrodes or terminals by the products of the reaction and conducting the gases from said closed chamber to a second chamber, substantially as described.

13. The art of generating electricity, which consists in producing chemical reaction in a closed chamber, charging or acting upon two electrodes or circuit-terminals by the products of such reaction, then reversing the chemical reaction, substantially as described.

14. In an apparatus for generating electricity, the combination, with the electrically-divided reaction-chamber, of electrodes connected with each division, and a vacuum apparatus connected with the chamber, substantially as described.

15. In apparatus for generating electricity, the combination, with the reaction-chamber, of vacuum apparatus connected therewith, substantially as set forth.

16. In apparatus for generating electricity, the combination, with the electrically-divided reaction-chamber, of the furnace heating one part of said chamber, and the steam-boiler absorbing heat from the other part of said chamber, substantially as set forth.

17. In apparatus for generating electricity, the combination, with the electrically-divided reaction-chamber, of the furnace heating one part of said chamber, the steam-boiler absorbing heat from the other part of said chamber, and the vacuum apparatus connected with said chamber, substantially as set forth.

This specification signed and witnessed this 14th day of September, 1883.

THOS. A. EDISON.

Witnesses:
EDWARD C. ROWLAND,
EDWARD H. PYATT.